(12) United States Patent
Kim

(10) Patent No.: US 6,658,441 B1
(45) Date of Patent: Dec. 2, 2003

(54) APPARATUS AND METHOD FOR RECURSIVE PARALLEL AND PIPELINED FAST FOURIER TRANSFORM

(75) Inventor: Seung Pil Kim, 45807 Corte Carmello, Temecula, CA (US) 92592

(73) Assignee: Seung Pil Kim, Mountain View, CA (US)

( * ) Notice: Subject to any disclaimer, the term of this patent is extended or adjusted under 35 U.S.C. 154(b) by 0 days.

(21) Appl. No.: 09/366,435

(22) Filed: Aug. 2, 1999

(51) Int. Cl.[7] ............................................. G06F 15/00
(52) U.S. Cl. ...................................................... 708/404
(58) Field of Search ................................. 708/400, 401, 708/403, 404, 405, 406, 408, 409; 342/195, 196; 382/254

(56) References Cited

U.S. PATENT DOCUMENTS

| | | | | |
|---|---|---|---|---|
| 3,662,161 A | * | 5/1972 | Bergland et al. | 708/404 |
| 4,060,850 A | * | 11/1977 | Speiser | 324/76.21 |
| 4,241,411 A | * | 12/1980 | Krasner et al. | 708/404 |
| 4,275,452 A | * | 6/1981 | White | 708/409 |
| 4,293,921 A | * | 10/1981 | Smith, Jr. | 708/405 |
| 4,344,151 A | * | 8/1982 | White | 708/622 |
| 4,471,357 A | * | 9/1984 | Wu et al. | 342/196 |
| 4,534,009 A | * | 8/1985 | McGee | 439/190 |
| 4,821,224 A | * | 4/1989 | Liu et al. | 708/821 |
| 4,839,844 A | * | 6/1989 | Watari | 708/410 |
| 4,929,954 A | * | 5/1990 | Elleaume | 708/401 |
| 4,970,674 A | * | 11/1990 | White | 708/404 |
| 5,034,910 A | * | 7/1991 | Whelchel et al. | 708/407 |
| 5,163,017 A | * | 11/1992 | Wong et al. | 708/406 |
| 5,365,470 A | * | 11/1994 | Smith | 708/406 |
| 5,528,736 A | * | 6/1996 | Kim | 345/644 |
| 5,535,291 A | * | 7/1996 | Spencer et al. | 382/254 |
| 5,805,106 A | * | 9/1998 | Baum | 342/159 |
| 5,805,485 A | * | 9/1998 | Ito et al. | 708/406 |
| 6,061,705 A | * | 5/2000 | Hellberg | 708/408 |
| 6,081,821 A | * | 6/2000 | Hopkinson et al. | 708/404 |
| 6,247,034 B1 | * | 6/2001 | Nakai et al. | 166/308 |
| 6,366,936 B1 | * | 4/2002 | Lee et al. | 708/404 |

OTHER PUBLICATIONS

Lang et al., The multidimensional Phase–Rotation FFT: A New Parallel Architecture, 1991, IEEE Transactions on Signal Processing, CH2977–7, 2889–2892.*

Soheil I. Sayegh, A Pipeline Processor for Mixed–Size FFT's, Aug. 8 1992, IEEE Transactions on Signal Processing, vol. 40, 1892–1900.*

Oppenheim and Shafer, Discrete–time signal processing, 1989, pp. 609–613, 1st Ed., Prenticce–Hall Inc., Englwood Cliffs, New Jersey USA.*

Sungwook Yu et al., A new pipelined implementation of the Fast Fourier Transform, IEEE 2000, pp. 423–427.*

* cited by examiner

Primary Examiner—Chuong Dinh Ngo
Assistant Examiner—Chat C Do

(57) ABSTRACT

A circuit for performing Fast Fourier Transform (FFT) with minimum number of clock cycles and minimum complexity. One-dimensional FFT of size $N=N_0 \times N_1 \times \ldots \times N_{M-1}$, $N_m$, $m=0, 1, \ldots, M-1$, positive numbers, is computed recursively, through a sequence of two-dimensional row-column transform computations of sizes, $N_0 \times N_1$, $(N_0 \times N_1) \times N_2$, $(N_0 \times N_1 \times N_2) \times N_3, \ldots, (N_0 \times N_1 \times \ldots \times N_{M-2}) \times N_{M-1}$ with twiddle factors. The complexity of the circuit is reduced by elimination of butterfly computation structure and adaptation of transposeless 2-D transform architecture.

11 Claims, 12 Drawing Sheets

FIG. 2-C
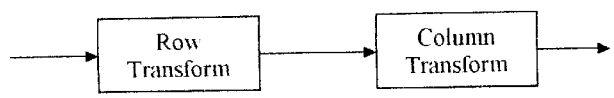
FIG. 2-D
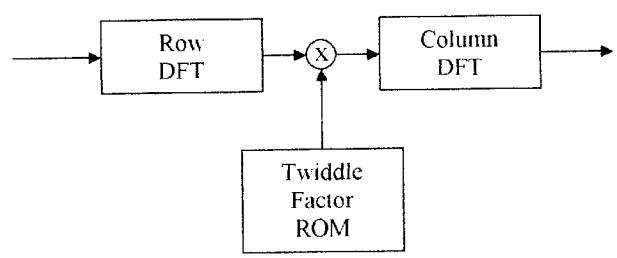
FIG. 2-E
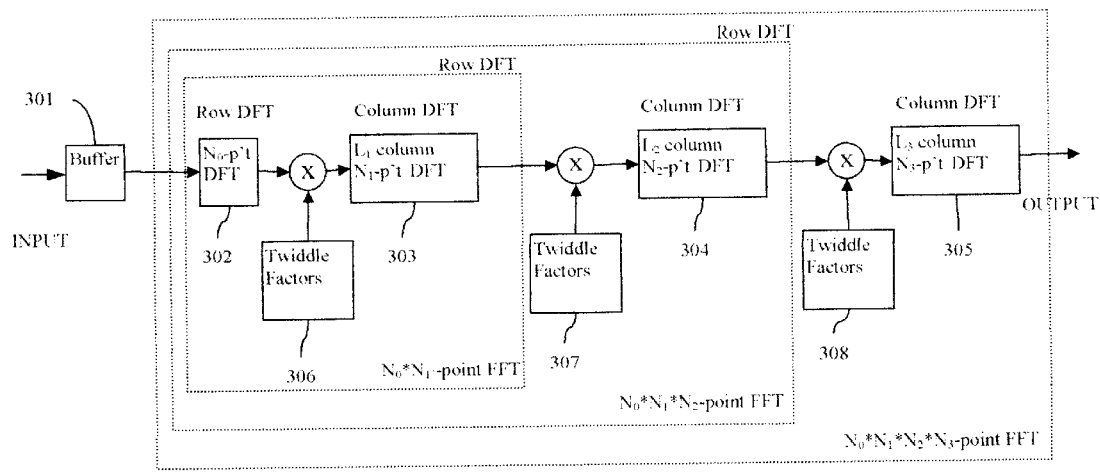

FIG. 3-A
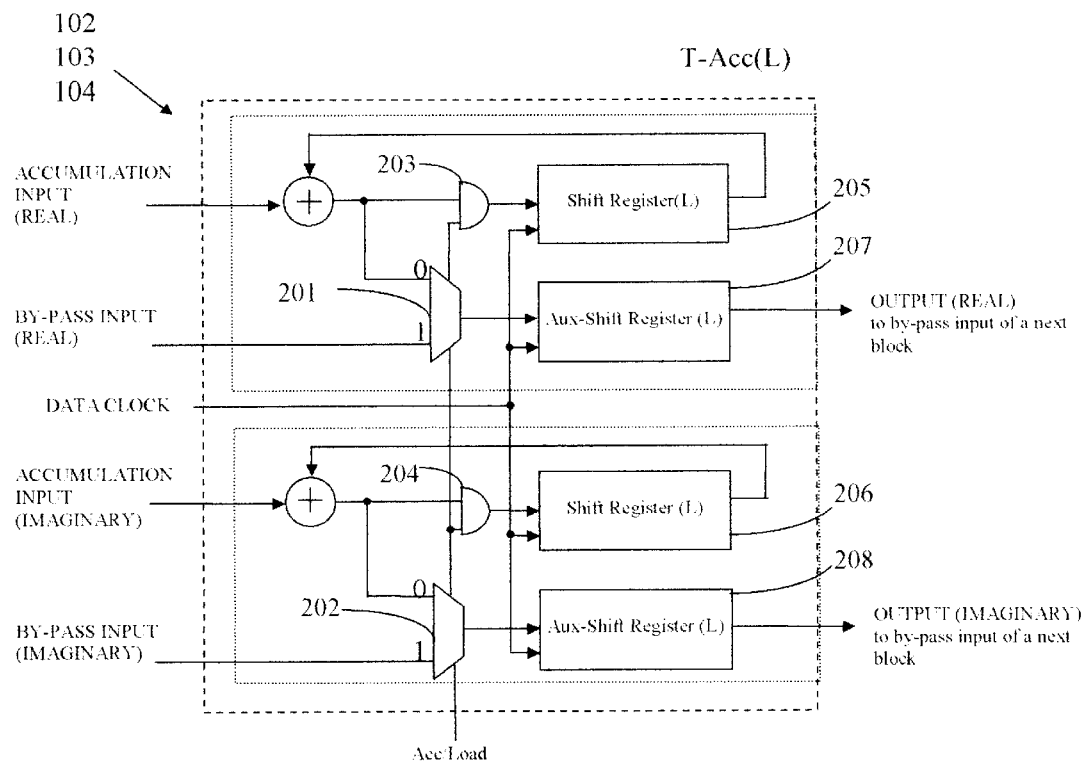
FIG. 3-B
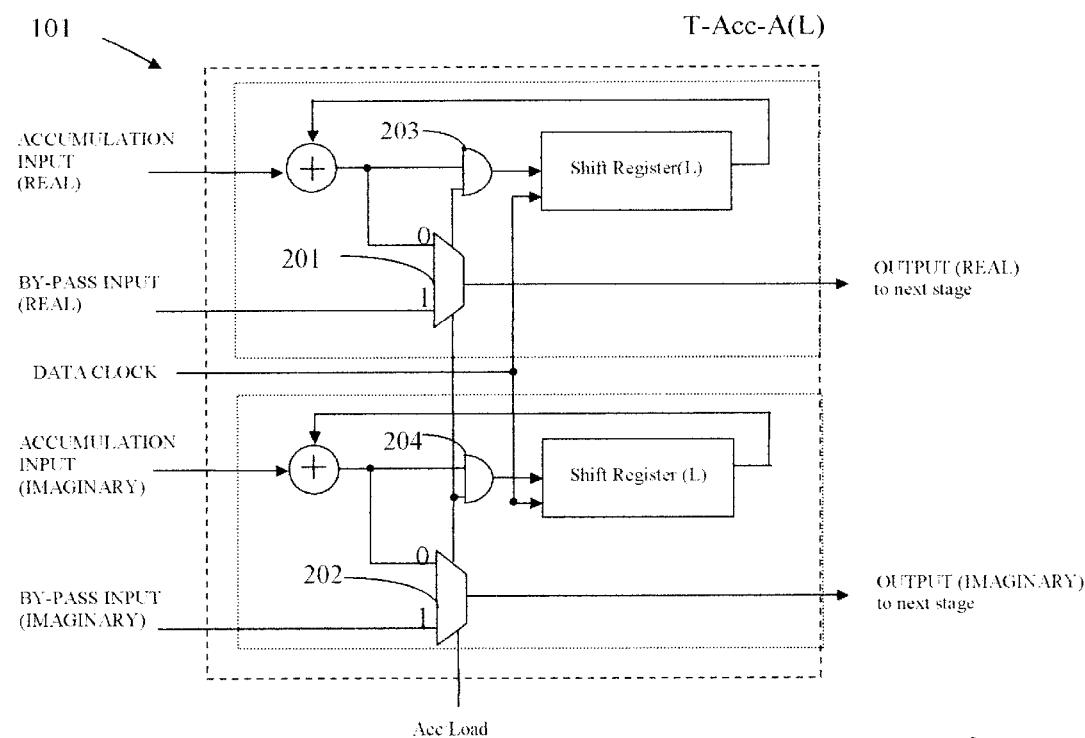

FIG. 3-C
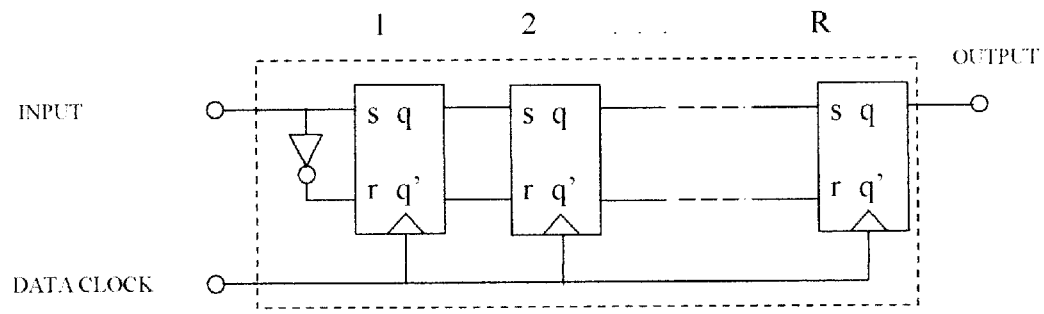
FIG. 3-D
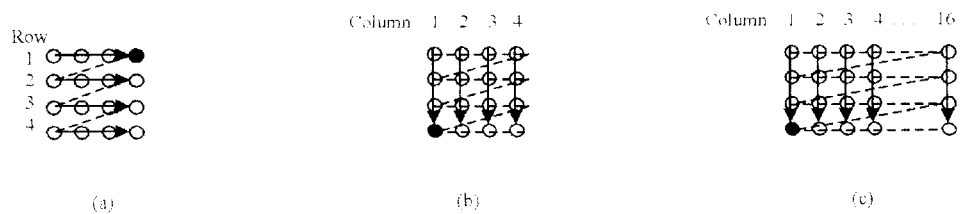
FIG. 4-A
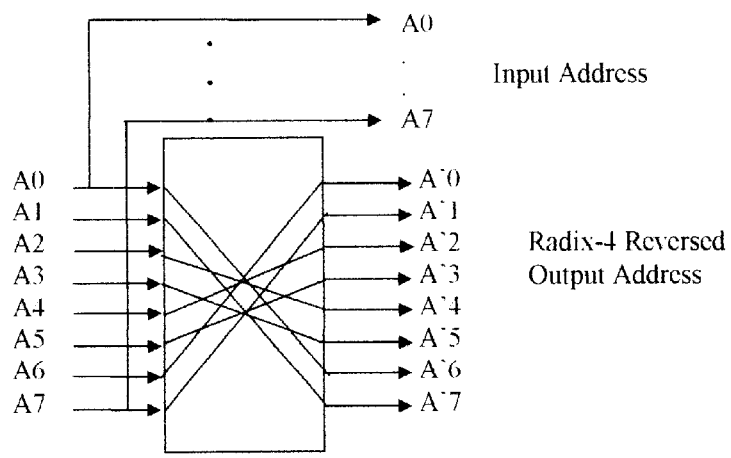

FIG. 4-B
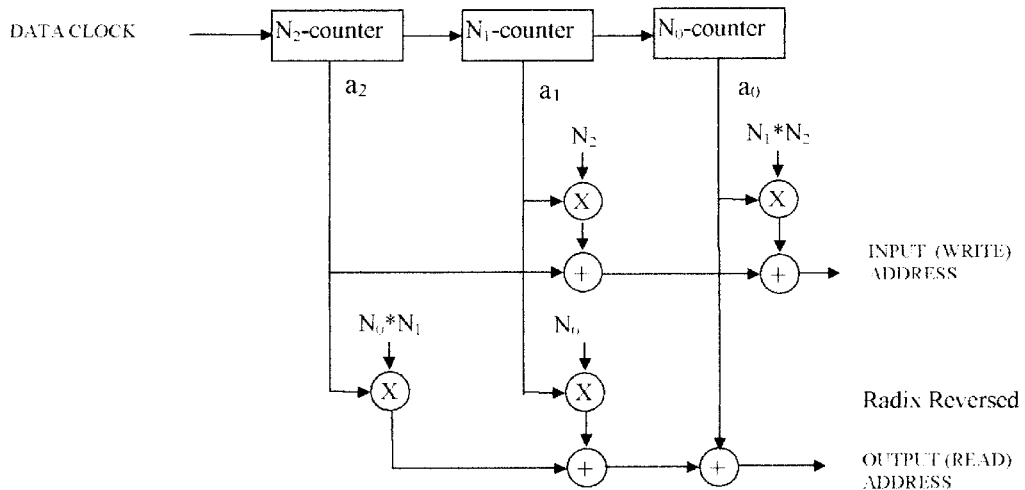
FIG. 5-A
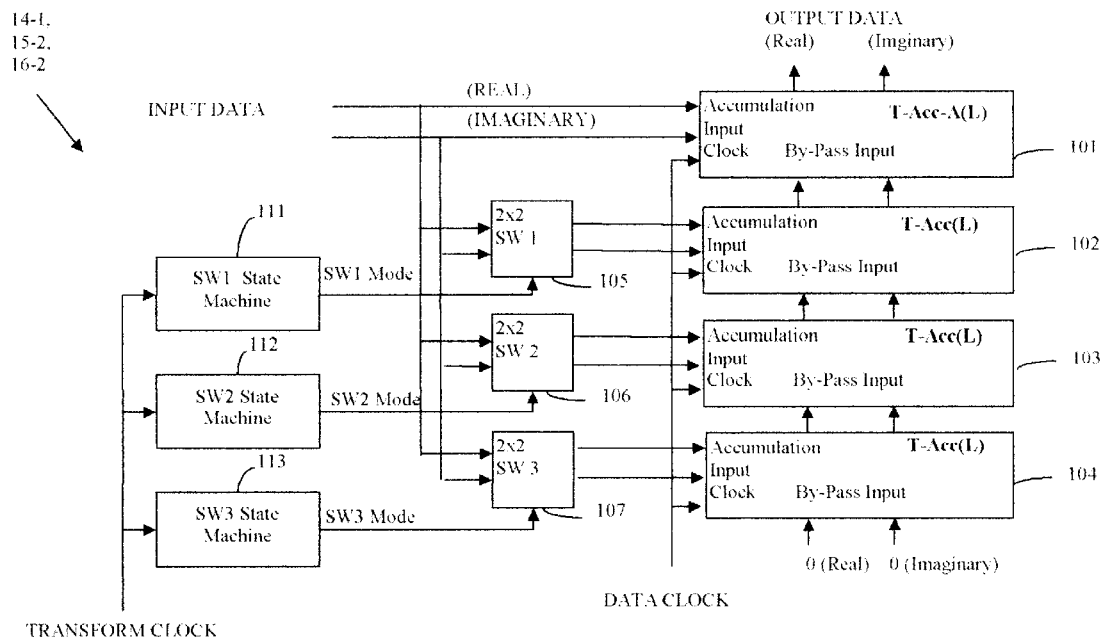

FIG. 5-B
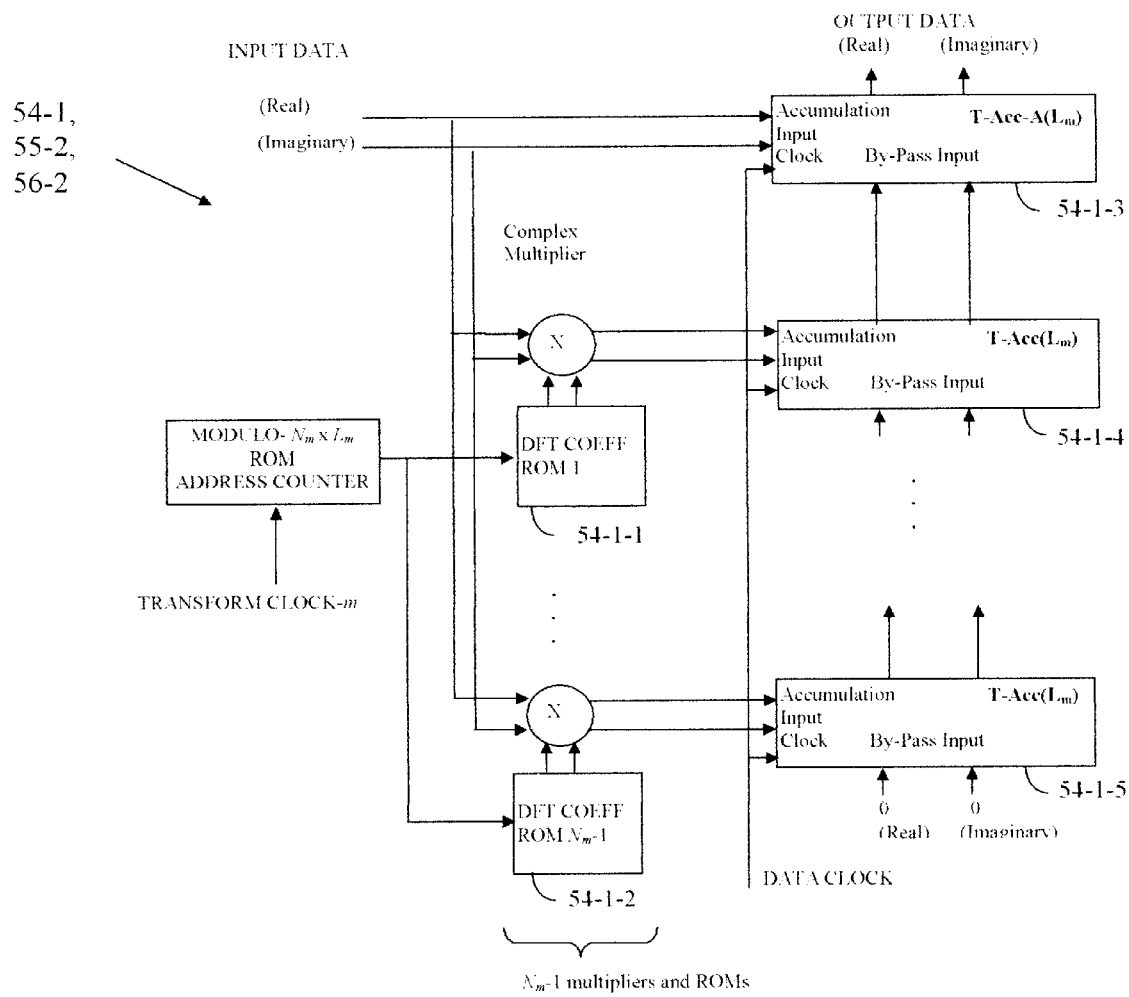
FIG. 6-A
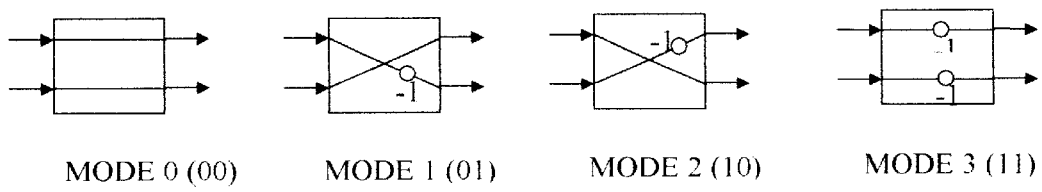
MODE 0 (00)   MODE 1 (01)   MODE 2 (10)   MODE 3 (11)

FIG. 6-B
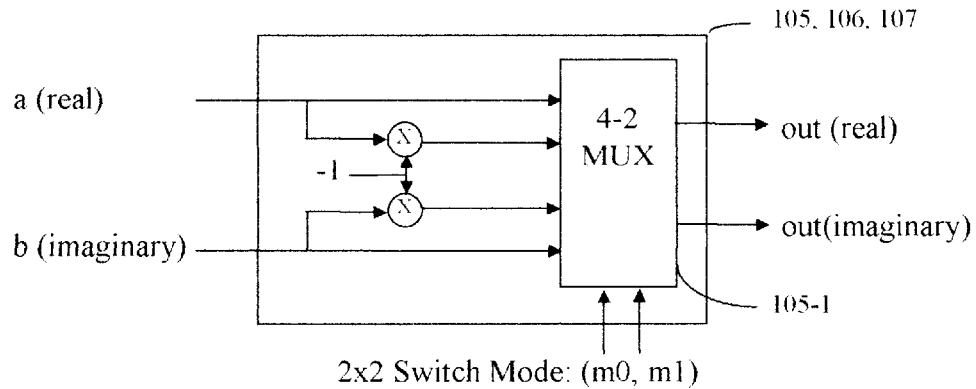
FIG. 6-C
Table 1: 2x2 Switch Modes (Input; Real = a, Imaginary = b)
| Mode | m1 | m0 | Out (Real) | Out (Imaginary) |
|------|----|----|------------|-----------------|
| 0 | 0 | 0 | a | b |
| 1 | 0 | 1 | b | -a |
| 2 | 1 | 0 | -b | a |
| 3 | 1 | 1 | -a | -b |
FIG. 6-D
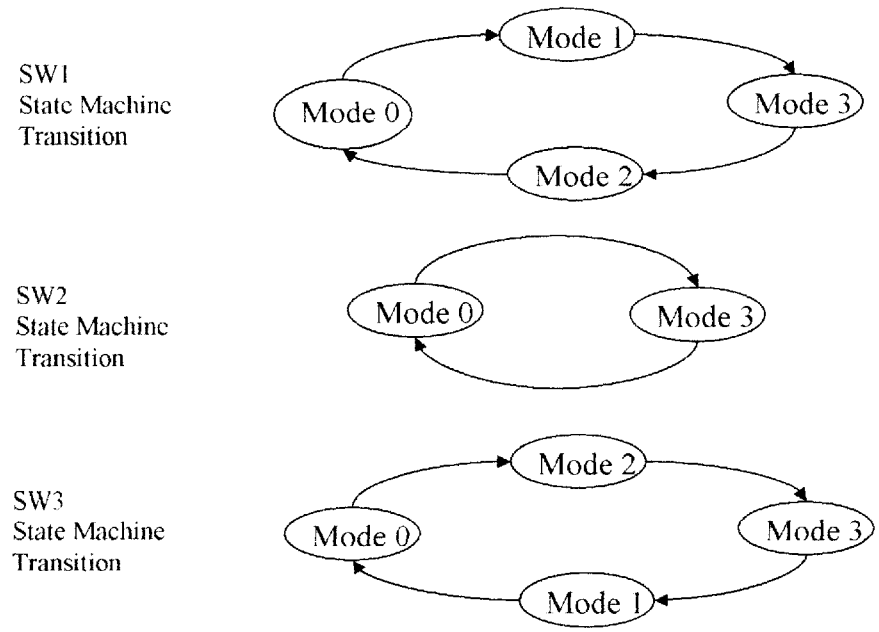
SW1 State Machine Transition
SW2 State Machine Transition
SW3 State Machine Transition

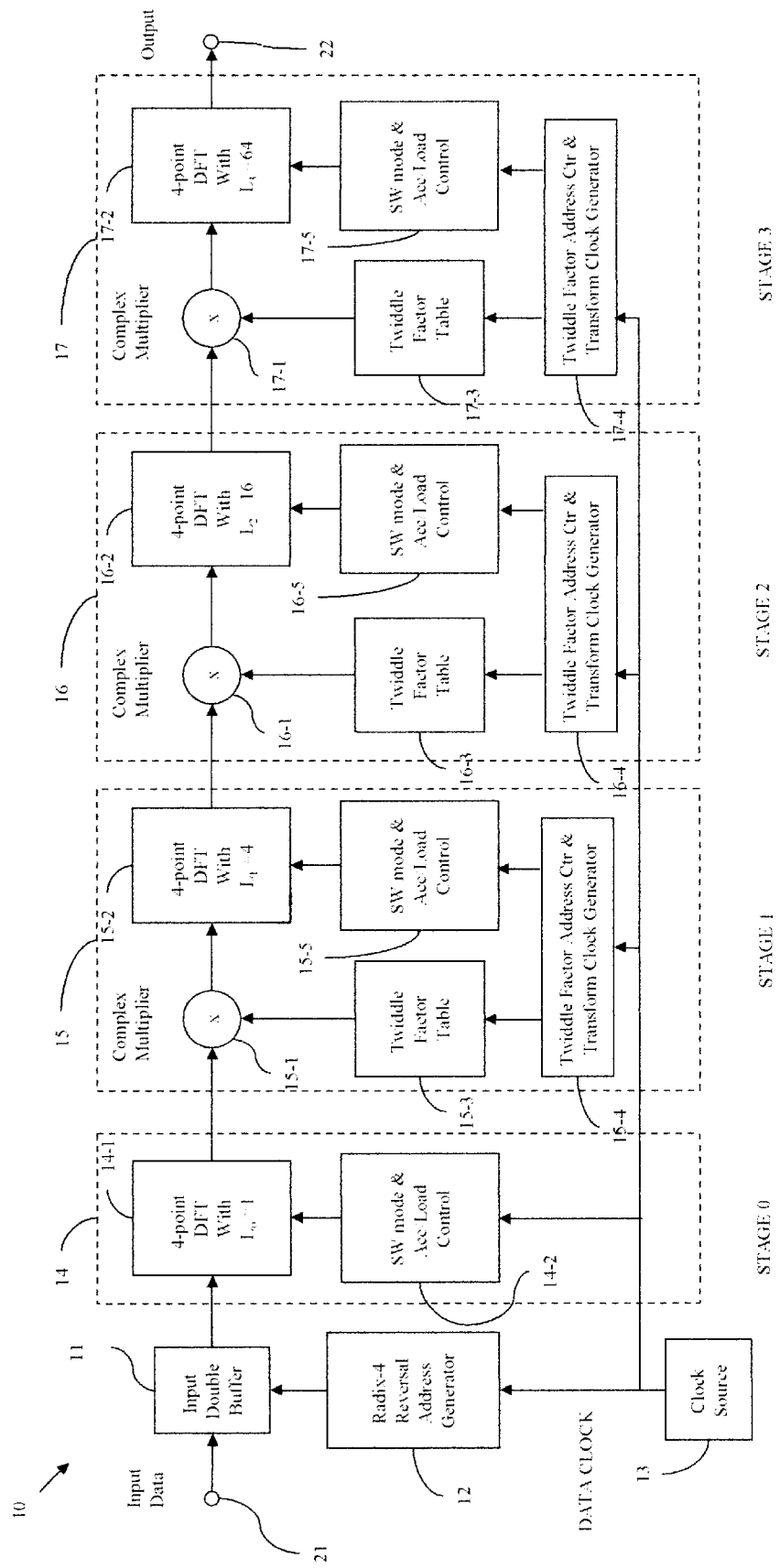
FIG. 7-A

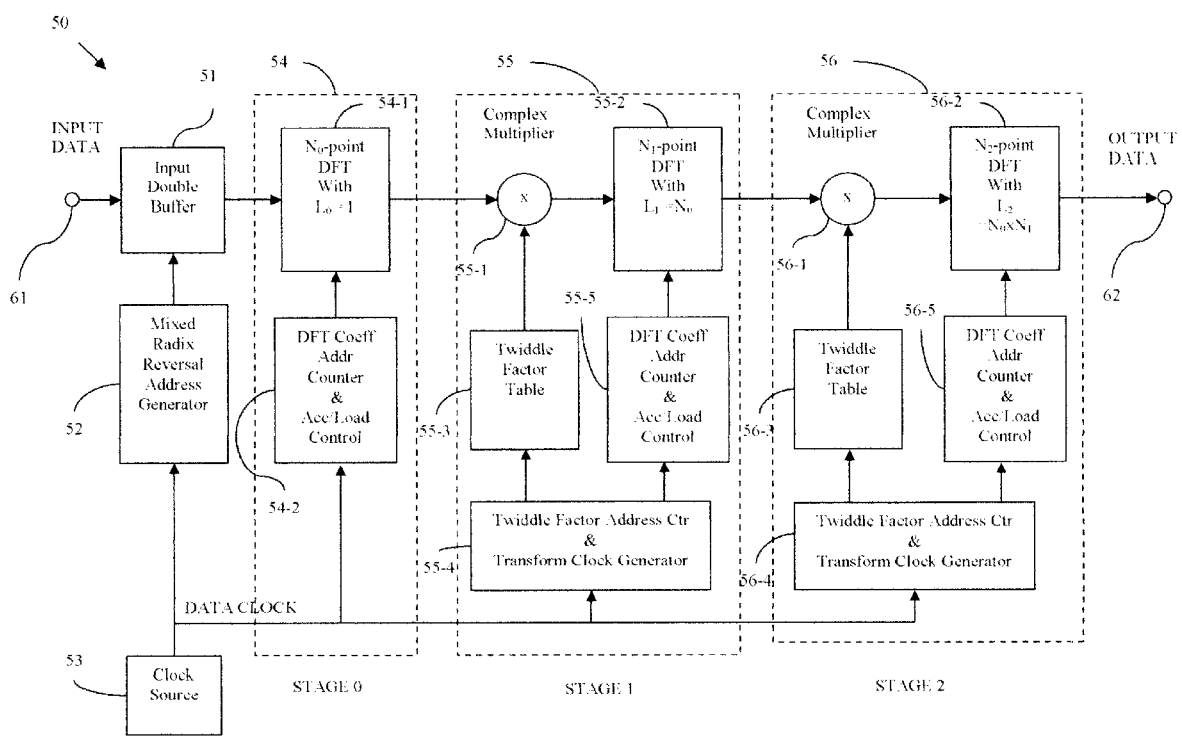
FIG. 7-B

FIG. 8-A
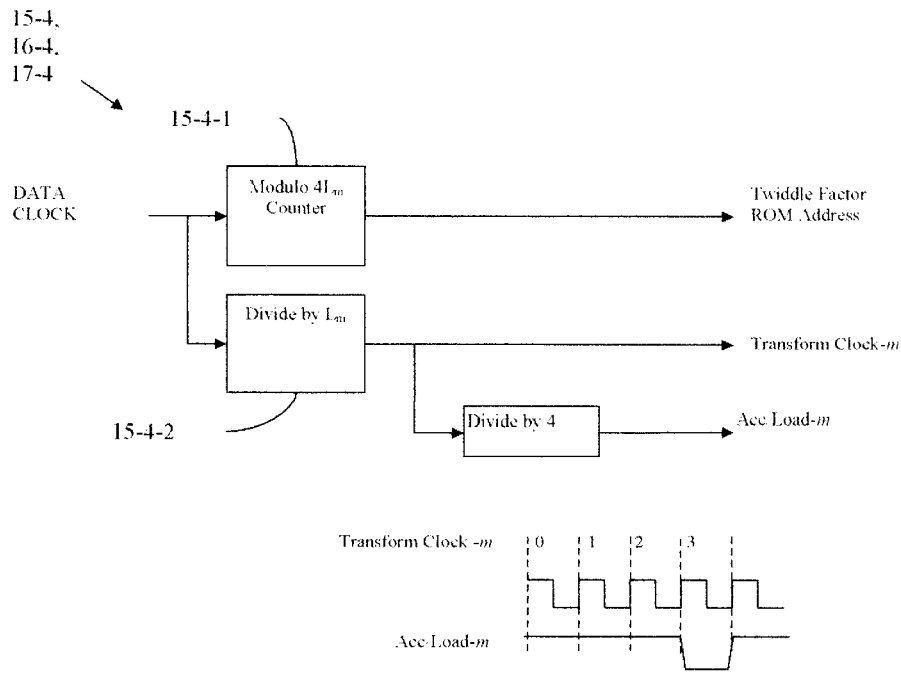
FIG. 8-B
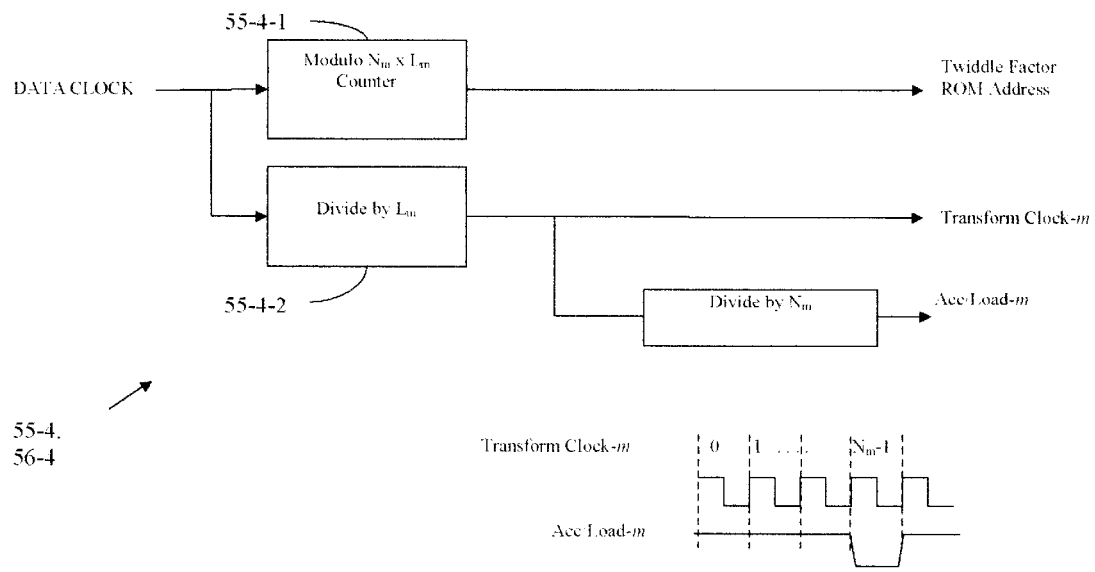

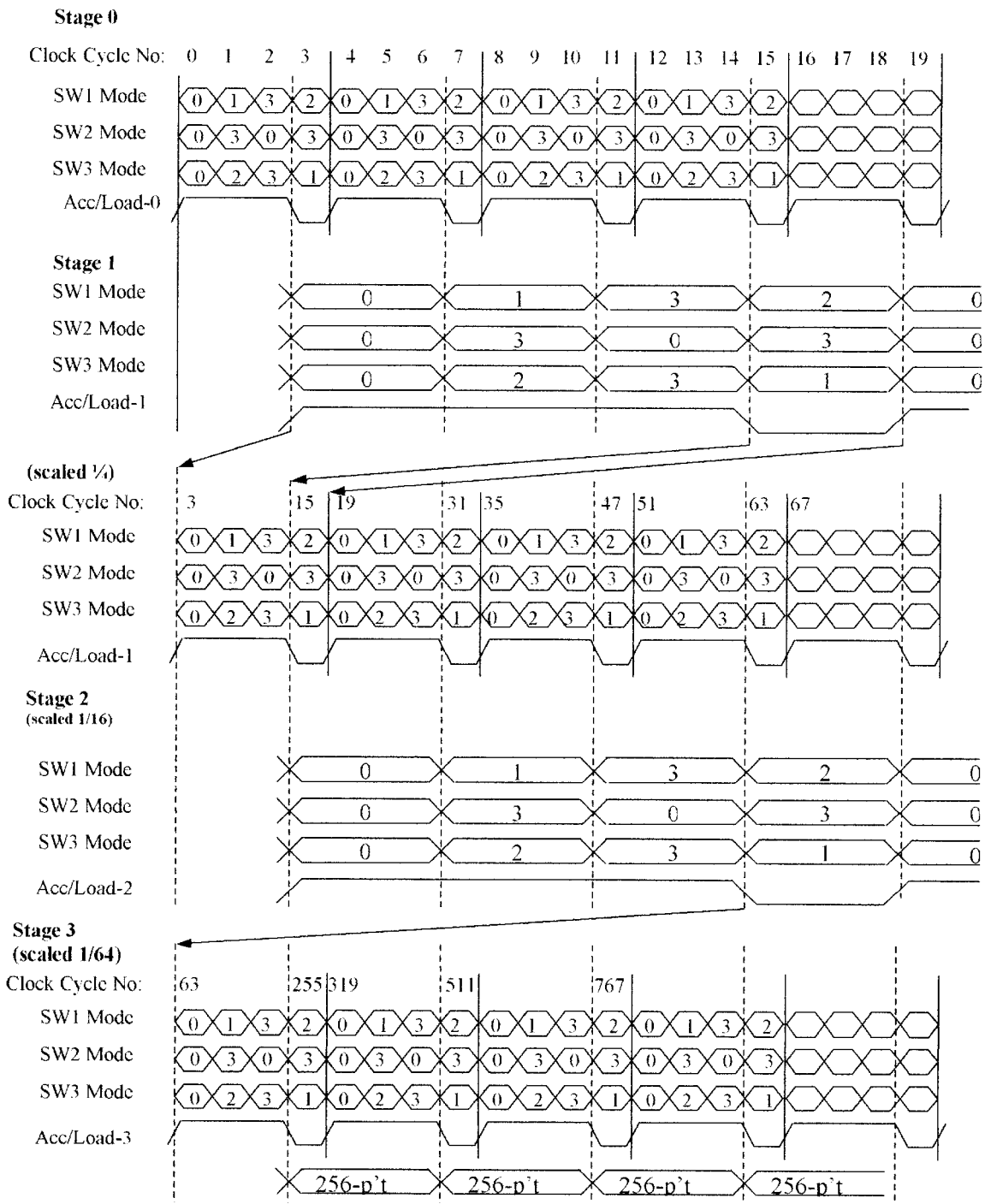
FIG. 9-A

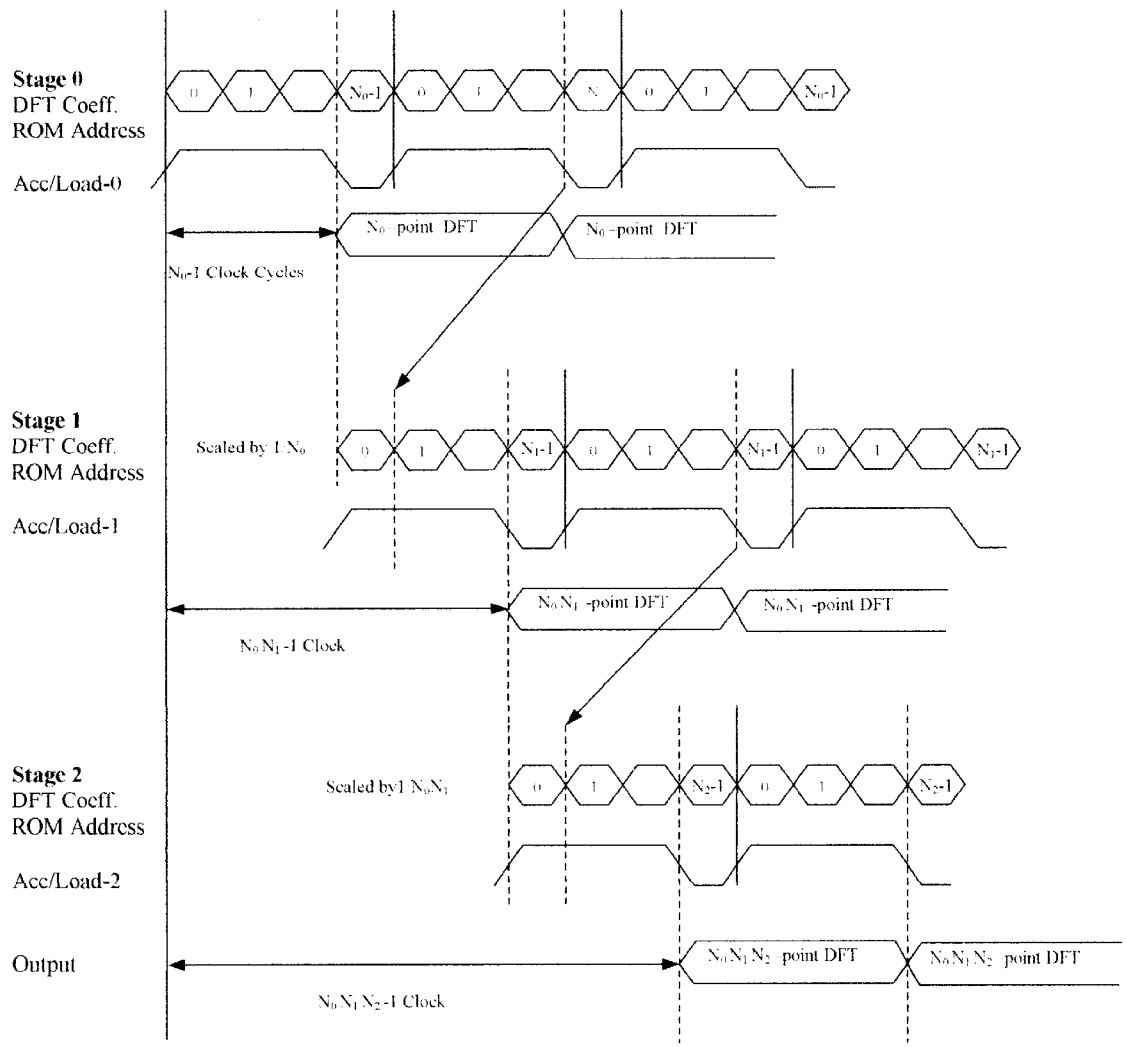
FIG. 9-B

US 6,658,441 B1

APPARATUS AND METHOD FOR RECURSIVE PARALLEL AND PIPELINED FAST FOURIER TRANSFORM

CROSS-REFERENCE TO RELATED APPLICATIONS

| US5529736 | 4/1992 | Kim | Current: 345,483, Original: 395/138 |
|---|---|---|---|
| US5163017 | 11/1992 | Wong et al | Current: 708/406, Original: 364/726 |
| US5034910 | 7/1991 | Whelchel et al | Current: 708/407, Original: 364/726 |
| US4821224 | 4/1986 | Liu et al | Current: 708/401; 708/409, Original: 364/726 |
| US4241411 | 12/1980 | Krasner | Current: 708/404, Original: 364/726 |
| US 6,247,034 B1 | 6/2001 | Nakai et al, | Current: 708/409; 708/404 |

OTHER PUBLICATIONS

Oppenheim et al, "Discrete-time Signal Processing" Prentice-Hall, N.J., 1989, pp609–618.

STATEMENT REGARDING FEDERALLY SPONSORED RESEARCH OR DEVELOPMENT

"Not Applicable"

REFERENCE TO A MICROFICHE APPENDIX

"Not Applicable"

BACKGROUND OF THE INVENTION

The usefulness of the Fast Fourier Transform (FFT) is often limited by the computation speed and power consumption. Many researches have been done in order to improve the speed through parallel and pipelined architecture implementation [U.S. Pat. Nos. 5,163,017, 5,034,910, 4,821,224, 4,241,411]. However, all previously known efforts are based on the so called 'butterfly structure' [Oppenheim, 1989] or some variations of it. As the FFT transform size increases, the butterfly size increases, i.e., the locations of input and output data become farther apart. In high speed hardware implementations, this puts a limit on the computation speed since data propagation can not be done at a faster clock rate without added hardware for pipelining. This results in higher complexity circuit with higher power consumption. The current invention does not use the butterfly architecture, and data propagation during the computation is minimized, while the number of computing elements is kept minimal. As a result, the present invention improves FFT computation efficiency over prior arts in terms of speed, hardware complexity and power consumption.

BRIEF SUMMARY OF THE INVENTION

The circuit performs one dimensional (1-D) FFT of size $N=N_0 \times N_1 \times \ldots \times N_{M-1}$ where, $N_m$ m=0, 1, ... M−1, and M are positive numbers, by implementing 1-D FFTs with progressively increasing sizes, $N_0$, $N_0 \times N_1$, $N_0 \times N_1 \times N_2$, ..., $N_0 \times N_1 \times \ldots \times N_{M-1}$, using two dimensional computation devices and methods recursively. First, an 1-D FFT of size $N_0 \times N_1$ is achieved by a two-dimensional transform device with a twiddle factor multiplier between row and column transform stages, where each transform sizes are $N_0$ and $N_1$, respectively. This is based on the algorithm described by Oppenheim [Oppenheim, pp609–618]. Once 1-D FFT of a size $N_0 \times N_1$ is computed, one can continue to compute a larger size 1-D FFT using a two-dimensional transform of an increased size $(N_0 \times N_1) \times N_2$ where only column transforms of $N_2$-point DFTs need be further computed following a prior transform of size $N_0 \times N_1$. New twiddle factors need be multiplied element by element before the new column transform. This process can be continued for a next size $((N_0 \times N_1) \times N_2 \times N_3$, and so on, until 1-D FFT of a desired size $N_0 \times N_1 \times \ldots \times N_{M-1}$ is achieved.

The complexity of the system is especially minimized if $N_m=4$ or 2, m=0, 1, ... M−1, since nontrival multiplications are required only for twiddle factor multiplications. As a result, the number of multiplication nodes in the signal flow is significantly reduced. Since a recursive two-dimensional transform data flow replaces prior art butterfly data flow in the FFT computation, the control circuit for computing butterfly memory address is removed. The combined effect of smaller number of multiplication nodes and simpler control makes the current FFT architecture and algorithm suitable for high-speed operation. Furthermore, by adopting a transpose-less pipelined 2-D transform architecture by Kim (U.S. Pat. No. 5,528,736), a preferred embodiment in the current invention, one output per clock computation throughput rate is achieved.

BRIEF DESCRIPTION OF THE SEVERAL VIEWS OF THE DRAWING

FIG. 2 is a schematic illustration of a FFT device according to present invention where each block is a smaller sized FFT device composed of row and column DFT transforms.

FIG. 3-A is a block diagram of the second type time-division multiplexed accumulator, T-Acc(L). It performs L independent accumulations by L-way time-division multiplexing. The storage devices are comprised of shift registers shown in FIG. 3-C.

FIG. 3-B is a block diagram of the first type time-division multiplexed accumulator, T-Acc-A(L). It lacks Aux-shift Registers.

FIG. 3-C is a block diagram for implementation of L-stage shift-registers.

FIG. 3-D is a block diagram of the second type time-division multiplexed accumulator, T-Acc(L), functionally same as FIG. 3-A, but shift registers are replaced with random access memory (RAM) and a modulo-L counter.

FIG. 3-E is a block diagram of the first time-division multiplexed accumulator, T-Acc-A(L), functionally same as FIG. 3-B, but shift registers are replaced with random access memory (RAM) and a modulo-L counter.

FIG. 4-A is a schematic diagram of radix-4 reversal implementation by switching address bit lines. The input and output addresses are used for buffer write and read, respectively.

FIG. 4-B is a block diagram of mixed radix ($N_0$, $N_1$, and $N_2$) reversal circuit.

FIG. 5-A is a block diagram of a device for computing L independent 4-point DFTs according to the present invention.

FIG. 5-B is a block diagram of a device for computing $L_m$ independent $N_m$-point DFTs according to the present invention.

FIG. 6-A shows four different modes of operation of 2×2 switches.

FIG. 6-B shows block diagram of 2×2 switches.

FIG. 6-C is a truth table, which defines the operation of 4-2 Mux in FIG. 6-B.

FIG. 6-D is a state transition diagram for 2×2 switches.

FIG. 7-A is a block diagram of 256-point FFT device where $N=256=4^4$.

FIG. 7-B is a block diagram of N-point mixed radix FFT device where $N=N_0 \times N_1 \times N_2$.

FIG. 8-A is a block diagram of the 'Twiddle Factor Address Counter and Transform Clock Generator' for radix-4 FFT. It has $4 \times L_m$ modulo counter for Twiddle Factor ROM address and a divider that divides input clock by $L_m$ for Switch & $A/L_m$ Control Signal block.

FIG. 8-B is a block diagram of the 'Twiddle Factor Address Counter and Transform Clock Generator' for mixed radix FFT. It has $N_m \times L_m$ modulo counter for Twiddle Factor ROM address and a divider that divides input clock by $L_m$ for $A/L_m$ Control Signal block.

FIG. 9-A is a timing diagram of 256-point FFT computation according to present invention. It clearly shows the number of clock cycles required (=255) to finish the computation. The result is available from the 256-th clock.

FIG. 9-B is a schematic timing diagram of N-point FFT according to present invention, where $N=N_0 \times N_1 \times N_2$, which shows the number of clock cycles required ($=N_0 \times N_1 \times N_2-1$) to finish the computation. The result is available from the $N_0 \times N_1 \times N_2$-th clock.

DETAILED DESCRIPTION OF THE INVENTION

Introduction:

This invention relates to devices and methods for performing one dimensional Fast Fourier Transform (FFT), and more particularly to such devices and methods in which input data are received serially word-by-word and FFT results are output serially word-by-word.

The FFT is used widely in science and engineering. A particularly important factor in real time application is computation time. It is usually necessary to increase the transform size N in order to increase the spectrum resolution since the resolution is proportional 1/N. However, as N is increased the amount of computation increases. Therefore the spectrum resolution or the transform size N is limited by the computation speed. In order to achieve the maximum computation speed, parallel and pipeline implementation is required. However, this results in very complex circuits due to increase data routing lengths in conventional method known as butterfly structure. As a result, such FFT systems are very expensive and currently single chip implementation is generally limited to N=1024. For the transform size N larger than 1024, multiple chips are normally used.

Accordingly, it is an objective of the present invention to provide a FFT device and method the provides most cost effective implementation. The current invention eliminates butterfly data flow structure yet achieves computational complexity reduction inherent to FFT algorithm. It is a further objective of the invention to provide a device and method for performing FFT faster (i.e., in fewer clock cycles) with less complexity and power consumption than in prior devices and methods.

Figure 1:
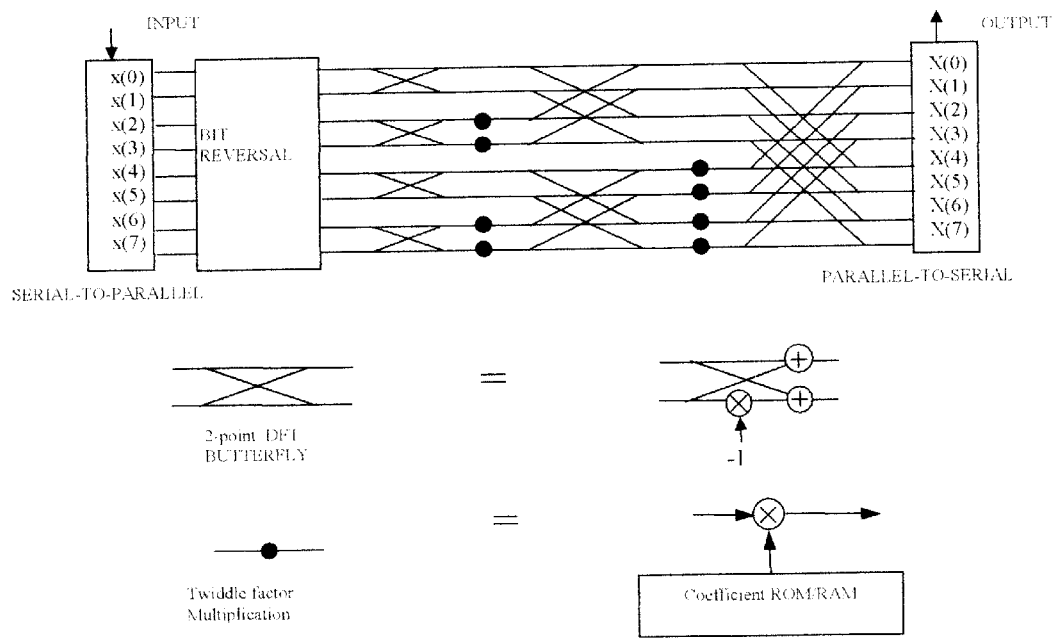
FIG. 1 is a schematic illustration of a FFT device according to the prior art, where for clarity of presentation, N=8 is used.
Figure 1:
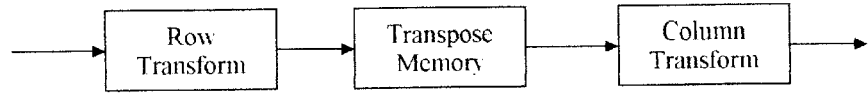
Figure 1:
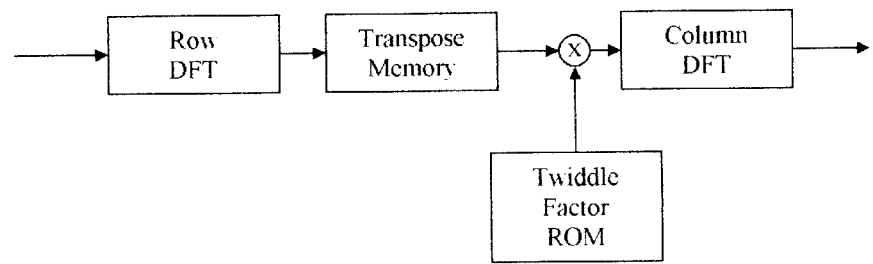

In accordance with the present invention, the foregoing objects are met by the provision of a device performing N point DFT by $N_1$ of $N_0$-point DFTs (row transforms) and $N_0$ of $N_1$-point DFTs (column transform) along with constant multiplications called twiddle factors between row and column transforms, where $N=N_0 \times N_1$. Due to the existence of twiddle factor multiplications, the result is not a 2-dimensional DFT transform, but a 1-dimensional DFT. The theory behind this is described in a following section and in Oppenheim[pp609–618]. One can extend this concept such that a large N-point DFT can be computed by many smaller DFTs using a recursive decomposition of a number N as $N=(...(((N_0 \times N_1) \times N_2) \times N_3) \times, ...) \times N_{M-1}$. This decomposition tolls that N-point DFT can be done by a sequence of 2-D DFTs of M stages. The computational complexity of this approach to DFT has been considered significantly higher than the well-known butterfly algorithm shown in FIG. 1. One of the reason for such an understanding is due to the fact that is requires M-dimensional transform signal flow. It is well known that high-dimensional transform requires very complicated data flow control due to multidimensional transpose operation necessary for the computations. Furthermore, this approach to DFT requires additional twiddle factor multiplications between consecutive dimensional transform.

Kim (U.S. Pat. No. 5,528,736) disclosed an art for parallel and pipelined two-dimensional transform that does not require transpose operation. Therefore, one can apply the art by Kim to the computation of the above DFT where received two-dimensional computations are required. However, modifications are required due to twiddle factor multiplications between stages. FIG. 2 shows conceptual block diagram of the present invention.

Of particular interest is the case when $N_0=N_1=N_2=...=N_{M-1}=4$ or 2 since the transforms themselves do not require multiplications. Only addition, subtraction and sign changes are required. The multiplications are required only for twiddle factors between stages. Therefore, there are only M−1 multiplication nodes in the signal flow. This is a significant improvement over prior art based on butterfly algorithm since the butterfly algorithm requires $(N/2)\log_2 N$ number of multiplication nodes while the present invention requires only $M-1=\log_2 N-1$, For example, for N=16, butterfly algorithm requires 8×4=32 multiplication nodes while present invention requires only 3 multiplication nodes.

Furthermore, present invention does not require complication memory address calculations between stages as butterfly algorithm does. Only simple counters are required when Random Access Memory (RAM) is need for computation buffer. If shift-registers are used for computation buffer, control circuit is further minimized. As a result, present invention is suitable for high speed circuit implementation.

THEORETICAL BACKGROUND

The N-point DFT is defined by the equation $$X[k] = \sum_{n=0}^{N-1} x(n) W_N^{kn}, k = 0, 1, \ldots, N-1, W_N = \exp\left(\frac{-j2\pi}{N}\right)$$

The present invention utilizes the following decomposition of Discrete Fourier Transform (DFT) originally developed by Cooley-Tukey and generalized by Burns [Oppenheim]. Suppose that the DFT size N can be factored as $N=N_0 \times N_1$. For a matter of convenience, let's say the data is an array with $N_0$ columns and $N_1$ rows. The DFT can be performed in the following three steps [Oppenheim, pp609–613].

Step 1: Perform $N_0$- point DFTs of the $N_1$ rows using the following index mapping.

$n=N_1 \times n_0+n_1, n_0=0,1, \ldots, N_0-1, n_1=0, 1, \ldots, N_1=1$ $$k = k_0 + N_0 \times k_1, \quad k_0 = 0,1,\ldots, N_0-1, \quad k_1 = 0,1,\ldots N_1-1$$

$$G[n_1, k_0] = \sum_{n=0}^{N-1} x[N_1 \times n_0 + n_1] W_N^{h\pi}, \quad k_0 = 0,$$

$$1, \ldots, N_0 - 1, n_1 = 0, 1, \ldots, N_1 - 1$$

Step 2: Multiply the twiddle factors;

$$\overline{G}[n_1, k_0] = W_N^{n_1 \cdot n} G[n_1, k_0], \quad k_0 = 0,1, \ldots, N_0-1, n_1 = 0,1, \ldots, N_1-1$$

Step 3: Perform $N_1$-point DFTs of the $N_0$ columns as $$X[k_0 + N_0 \times k_1] = \sum_{n=0}^{N-1} \overline{G}[n_1, k_0] W_N^{h\pi},$$

$$k_0 = 0, 1, \ldots, N_0 - 1, k_1 = 0, 1, \ldots, N_1 - 1$$

Notice that lack of the Step 2 would perform $N_0 \times N_1$ two dimensional DFT.

In the previous art (U.S. Pat. No. 5,528,736), it has been disclosed that 2-dimensional block transform with size $N_0 \times N_1$ can be computed with $N_0 = N_1$ clock cycles. Therefore, if one adopts the architecture, one can finish the $N_0 \times N_1$-point FFT in $N_0 \times N_1$ clock cycles. However, this requires $N_0 + N_1$ multipliers in addition to a twiddle factor multiplier. For example, the 256-point DFT can be computed in 256 clock cycles using 16×16 decomposition. The number of complex multipliers will be 16+16+1=33. In fact, using the two-dimensional transform architecture in the previous art, the computational complexity is still big at The Number of Multiplications=$N_0 \times (N_1)^2 + N_1 \times (N_0)^2 \times N_0 N_1 (N_0 + N_1)$ which is much larger than known FFT algorithms.

In order to achieve a computational reduction, decompositions are continued recursively, with a preferred factor of 4. For example, if N=256 one can compute the DFT by 64×4, i.e., N1=64, and N2=4 for the index mapping described above. Apply the similar decomposition to the 64-point DFT, which is 16×4. Similarly, the final 16-point DFT is done by 4×4 decomposition. Therefore, one only needs 4-point DFTs, which can be done without multiplications. The only multiplications are twiddle factor multiplications. The resulting computation structure is depicted in FIG. 2, with $N_0 = N_1 = N_2 = N_3 = 4$.

The two dimensional transform structure by Kim (U.S. Pat. No. 5,528,736) is modified for the first stage 4×4 decomposition DFT composition. First, a twiddle factor (complex) multiplier is inserted between row and column DFT stages. Next, the column DFT is implemented with multiplicity factor $L_1 = 4$ using time-division multiplexed accumulator denoted as T-ACC. The construction of T-ACC with multiplicity L are shown in FIG. 3-A through FIG. 3-E. The first stage 4×4 decomposition DFT constitutes a row transform block for 16-point DFT, and it is followed by a column transform (4-point DFT) after a twiddle factor multiplier. Since the row transform size is 16, the column transform multiplicity is required to be $L_2 = 16$. Now, the first and second stage constitute a row transform (64-point DFT) block. Another column transform stage (4-point DFT) is followed after a twiddle factor multiplier. Similarly, the multiplicity factor for the column transform stage should be $L_3 64$ since the processing row transform size is 64. The final output is 64×4=256 point DFT. The detailed operation of 256-point DFT computations is given in a later section.

In a preferred embodiment of the current invention, radix-4 decomposition is used by applying the index mapping $n = N_1 \times n_0 + n_1$, $n_0 = 0,1, \ldots, N_0 - 1$, with $N_0 = 4$, repeatedly, while $N_1$ increases by a factor of four each time, i.e., $N_1 = 4$, 16, 64, . . . Because of this repeated index mapping, the ordering of input data should be shuffled. More specifically, input does need to be radix-4 reversed, which is described next.

RADIX-4 REVERSAL

Assume that a block of data x(n), n=1,2, . . . , N, with size N=256 is stored in the input buffer in the incoming order n=1, 2, . . . , N. Radix-4 reversal is achieved through switching address lines during the buffer read operation as follows.

Let's assume that 8 bit address lines A0–A7 are used to store the 256 input data (A7 being the most significant bit, or MSB). The address in binary form is; Address=(A7)(A6) (A5)(A4)(A3)(A2)(A1) (A0) where (An), n=0,1, . . . , 7, are binary numbers; either zero or one. Since the address is always a positive number, its decimal value is given by;

Address=(A7)*128+(A6)*64 +(A5)* 32+(A4)*16 +(A3) *8 +(A2)*4+(A1)*2 +(A0).

The address is radix-4 form representation is;

Address=((A7)(A6))((A5)(A4))((A3)(A2))((A1)(A0)) while its decimal value is;

Address=((A7)(A6))*64+((A5)(A4))*16+((A3)(A2))*4+ ((A1)(A0))

Radix-4 reversal is achieved by swapping coefficients as follows;

((A7)(A6))<–>((A1)(A0)), ((A5)(A4))<–>((A3)(A2)).

Therefore, the address lines during the buffer read are interchanged as follows;

A0<–>A6,A1<–>A7,A2<–>A4,A3<–>A5.

FIG. 4-A shows how address lines are swapped during memory read operation in order to achieve radix-4 reversal.

MIXED RADIX REVERSAL

In a general case when index mapping is based on the factorization $N = N_0 \times N_1 \times \ldots \times N_{M-1}$, M a positive integer, mixed radix reversal is necessary. The mixed radix reversal is given as follows. A given memory location A can be represented in a form, $A = \alpha_{M-1} P_{M-1} + \alpha_{M-3} P_{M-2} + \ldots + \alpha_0$, where, $0 \leq \alpha_{M-1} < N_0$, $0 \leq \alpha_{M-2} < N_1$, . . . , $0 \leq \alpha_0 < N_{M-1}$, and where, $P_{M-1} = N_1 \times \ldots \times N_{M-1}$, $P_{M-2} = N_2 \times \ldots \times N_{M-1}$, . . . $P_1 = N_{M-1}$. The mixed radix reversed address is mapped according to the relation, , $A' = \alpha_0 Q_{M-1} + \alpha_1 Q_{M-2} + \ldots + \alpha_{M-1}$ where $Q_{M-1} = N_0 \times \ldots \times N_{M-2} Q_{M-2} = N_0 \times \ldots \times N_{M-3}, \ldots$, $Q_1 = N_0$.

For example, if M=3, then $N = N_0 \times N_1 \times N_2$, and three counters, $N_2$-counter, $N_1$-counter, $N_1$-counter and $N_0$-counter are used. Assume that these counters are connected in series, $N_2$-counter being the first one followed by $N_1$-counter and followed by $N_0$ counter. Let the values of the each counter be denoted as $\alpha_2$, $\alpha_1$, and, $\alpha_0$, respectively. The decimal value of the input buffer address counter will be $A = \alpha_0 \times N_1 \times N_2 + \alpha_1 \times N_2 + \alpha_2$. The radix reversed output address is given by $A' = \alpha_2 \times N_1 \times N_0 + \alpha_1 \times N_0 + \alpha_0$. Therefore, one needs multipliers and adders for a general radix reversal as shown in FIG. 4-B.

RADIX-4 FFT circuit with 2×2 SWITCHES

As is well known to those skilled in the art, the 4-point FFT is given by the following computation. For four complexes input data x(n)=an+jbn, n+0,1,2,3, the four complex outputs X(n), n=0,1,2,3, are computed as X(0)=a0+a1+a2+a3+j(b0+b1+b2+b3)
X(1)=a0+b1−a2−b3+j(b0−a1−b2+b3)
X(2)=a0−a1+a2−a3+j(b0−b1+b2−b3)
X(3)=a0−b1−a2+b3+j(b0+a1−b2−a3)

Therefore no multiplications are needed to compute the 4-point FFT. This 4-point FFT is implemented in a parallel structure as shown in FIG. 5-A. The addition and subtraction in the above equations are performed by 2×2 switches in FIG. 6-A with appropriate mode selections. There are four modes of operations of said 2×2 switch boxes. Mode 0 directly passes real input to real output, and imaginary input to imaginary output. Mode 1 passes real input to imaginary output with sign change, and imaginary input to real output. Other modes operate in a similar way as indicated by FIG. 6-A. FIG. 6-B is the block diagram of the 2×2 switch, devices 105, 106 and 107 in FIG. 5-A. Two lines, m0 and m1 are used to control the 4-2 multiplexer, device 105-1, whose operation is defined by the truth table in FIG. 6-C. The four inputs to the multiplexer are a, −a, b, −b, where a and b are real and imaginary parts of a complex input. The 2×2 switch output has real and imaginary parts forming a complex output.

The three 2×2 switches in FIG. 5-A make state transitions as shown in FIG. 6-D at each transform data clock all starting from Mode 0. The states of the 2×2 switches are controlled by state machines, devices 111, 112, and 113, defined by FIG. 6-C and FIG. 6-D. FIG. 7-A shows more detailed block diagram of 256-point FFT implementation according to the present invention.

The 4-point at Stage 0, device 301 in FIG. 2, and device 14-1 in FIG. 7-A, has multiplicity $L_0$=1. Its construction shown in FIG. 5-A with L=1 has T-ACC(1) and T-ACC-A(1) shown in FIG. 3-A and FIG. 3-B, respectively. Since these time-division multiplexed accumulators with L=1 have only one stage of shift resistors, they are similar to regular accumulators. Furthermore, Data Clock and Transform Clock are identical since they are related by division-by-$L_0$ as shown in FIGS. 8-A/B. After the first three clock cycles, the primary shift-register within T-Acc-A(1), device 101 in FIG. 5-A has a value a0+a2+a2+j(b0+b1+b2), three accumulations toward X(0); the primary shift-register within the T-Acc(1), device 102, has a value a0+b1−a2+j(b0−b0−b2), three accumulations toward X(1); the primary shift-register within device 103 has a value a0−a1+a2+j(b0−b1+b2), three accumulations toward X(2), and the primary shift-register within device 104 has a value a0−b1−a2+j(b0+a1−b2) three accumulations toward X(3). At the fourth clock cycle, the final 4-point DFT results are computed, but the results are directed to axillary shift-registers and the primary registers are reset by the signal A/$L_0$=0 through AND gates, device 203 and 204 in FIG. 3-A and B. Therefore, at the $4^{th}$ clock, the 4-point DFT block 301 or 14-1 generates the first output. The rest of three components are stored in the auxiliary registers in devices 102, 103, and 104. When A/$L_0$ returns to high, those three auxiliary registers are connected in series. At the following three clock cycles ($5^{th}$, $6^{th}$, and $7^{th}$ clocks) the DFT data results are shifted out.

The 4-point DFT block at Stage 1, device 302 in FIG. 2, and device 15-2 in FIG. 7-A, has multiplicity $L_1$=4. Therefore, its construction shown in FIG. 5-A with L=4 has T-Acc(4) and T-ACC(4) having 4-stage shift-registers for primary and auxiliary storages, respectively. Also notice that Transform Clock is four times slower than Data Clock from FIGS. 8-A/B. As a result, 2×2 SW mode transition as well as accumulation/load control signal A/$L_1$ occur at four times slower rate compared with Stage 0. Therefore, the same computations are performed on four consecutive input data, which are 4-point DFT (row transform) results from Stage 0. This process is continued until three DFT results from Stage 0 are transferred to Stage 1. Upon start of the $4^{th}$ DFT output from Stage 0, A/$L_1$ goes to low directing final calculation at Stage 1 to auxiliary shift-registers and clearing primary registers. The signal A/$L_1$ stays low for four clock cycles and during this period all the auxiliary shift-registers are loaded with the transform results, and primary shift-registers are cleared. FIG. 9-A shows timing relationships among control signals A/$L_m$ m=0,1,2,3, and 2×2 SW modes within the devices 14-1, 15-2, 16-2, and 17-2 in FIG. 7-A. Notice that timing relationships are identical at each stage except for progressively slower clock rates.

Similarly, at Stage 2, Transform Clock is 16 times slower than Data Clock. The same computations are performed on 16 elements in each of row transform blocks(16-point DFTs). Upon start of the $4^{th}$ 16-point DFT output from Stage 1, A/$L_2$ goes to low directing final calculations at Stage 2 to auxiliary shift-registers, while clearing primary registers.

The similar process continues for Stage 3 where Transform Clocks are 64 times slower than Data Clock and 256-point FFT is obtained at the output.

MIXED-RADIX FFT

When one of the decomposition factor $N_m \neq 4$, a more general DFT computation block shown in FIG. 5-B is used. The 2×2 switches are removed and a set of $N_m$−1 complex multipliers with $N_m$-point DFT coefficient ROMS (devices 54-1-1 through 54-1-2 in FIG. 5-B) are introduced. Input data are connected to all of $N_m$−1 complex multipliers in parallel and the outputs of $N_m$−1 complex multipliers are connected to the accumulation inputs of $N_m$−1 of T-Acc($L_m$) s(devices 54-1-4 through 54-1-5 in FIG. 5-B) respectively. The outputs of T-Acc are connected to by-pass inputs of the next T-Acc. The output of the last T-Acc in the sequence, devices 54-1-4, is connected to by-pass input of T-Acc-A, device 54-1-3. The accumulation input of T-Acc-A is connected to input data and the output constitutes the output of the DFT block, devices 54-1, 55-2 or 56-2.

In FIG. 7-B, device 50, an embodiment of N-point FFT where N=$N_0$×$N_1$×$N_2$, is shown where the decomposition factor $N_m$m=0,1,2, are not limited to 4 (mixed radix).

A block of complex input data is supplied to the input terminal 61, word-by-word, where the block size N=$N_0$× $N_1$×$N_2$. The input buffer, device 51, stores the input data until all the N data are received. During the input operation, the Input Address generated by device 52, shown in FIG. 4-B, is used. When all the N data are received, device 54 starts to read the data in the input buffer using the Output Address generated by device 52. During this process, the ordering of input data has been mixed radix reversed with radices being $N_0$, $N_1$ and $N_2$. All this operation is based on the basic clock generated by device 53.

At Stage 0, device 54, where $L_0$=1, the sizes of the shift registers or RAMs inside device 54-1 are one word length. Therefore, it takes $N_0$ clock cycles to finish the $N_0$-point DFT with the device 54. The $N_0$-point DFT block, device 54-1, is shown in FIG. 5-B. The device 54-1 has $N_m$−1 complex multipliers to compute the $N_m$ components of $N_m$-point DFT in parallel, since no multiplier is needed for the DC component. The DFT coefficients ROMs, devices 54-1-1 through 54-1-2 stores the $N_m$DFT condition, n=0, 1, . . . , $N_m$−1, where l=1 for the first ROM, l=2 for the second ROM and so forth up to l=$N_m$−1. The A/$\underline{L}0$ control signal, as specified by FIG. 9-B, is generated by the device 54-2, which is a simple divider as shown in FIG. 8-B.

At Stage 1, device 56, L=N$_0$. Therefore, the T-Acc(L) has N1-word primary and N1-word auxiliary storages. The N$_0$ independent column DFTs (N2=p't DFT) are performed in the time-division multiplexed fashion. Therefore, it takes N$_0$×N$_1$clock cycles to finish all N$_0$ of N$_1$-point DFTs. Before the computation all the inputs are multiplied with appropriate twiddle factors by device 55-1, where twiddle factors are read from the ROM, device 55-3, with addresses from the address counter, device 55-4. The address counter, device 55-4, shown in FIG. 8-B generates two outputs, one for the twiddle factor ROM and the other for A/L Control Signal Generator. The details of twiddle factor tables are given in the next section.

At Stage 2, device 56, L$_2$=N$_0$×N$_1$. Therefore, the T-Acc (L$_2$), inside the device 56-2, has -word primary and another N$_0$×N$_1$-word auxiliary storages. The total number of N$_0$×N$_1$ independent column DFTs (N$_1$-p't DFT) are performed in the time-division multiplexed fashion. Therefore, it takes N$_0$×N$_1$×N$_2$ clock cycles to finish all the N$_2$-point DFTs. Before the computation, all the inputs are multiplied with appropriate twiddle factors by device 56-1, where twiddle factors are read from the ROM, device 56-3, with addresses from device 56-4. The details of twiddle factor tables are given in the next section.

The control signal A/$\underline{L}_m$ (=Accumulation/Load),m=0, 1, . . . , M−1, switches the flow of accumulation results between primary storage and auxiliary storage devices for pipelined operation. The A/$\underline{L}_m$, m=0,1, . . . , M−1 signals go to low as soon as the first N$_m$=1 accumulation are finished at each of the primary storage cells. Hence, at the Stage 0, device 54, A/$\underline{L}_0$ goes to low after N$_0$−1 clocks of high as shown in FIG. 9-B. At the Stage 1, it goes to low after N$_0$×(N$_1$−1) clocks of high as shown in FIG. 9-B. Similarly, at Stage 2, it goes to low after N$_0$×N$_1$×(N$_2$−1)clocks of high. These timings are shown in FIG. 9-B. The A/L signal generators, within devices 54-2, 55-5, and 56-5, are simple dividers as shown in FIG. 8-B, with negative pulse output (with the same width as input clock) at every N$_m$-th input clock at the Stage m, m=0,1, . . . , M−1.

TWIDDLE FACTOR TABLES

First the preferred embodiment, where N=4$^M$, is described. Each stage performs L independent column DPTs for an L×4 input data array, where the number L increases by four times at each stage starting from L$_0$=1. Here the subscript index is removed for simplicity and in the following description. The twiddle factors are functions of L, as a result, they are different at each stage. For the example of N=256=4$^4$, at Stage 0, no twiddle factors are needed (all twiddle factors are ones) since it's a straight forward 4-point DFT (L=1). At the following stages, twiddle factors are needed for a two dimensional array 4×L, where L increases four times at each stage. The twiddle factors are computed as defined by the following array as a function of L;

$$\begin{bmatrix} 1 & 1 & 1 & 1 & \dots & 1 \\ 1 & W_K & W_X^2 & W_K^3 & \dots & W_K^{L-1} \\ 1 & W_X^2 & W_X^4 & W_X^6 & \dots & W_X^{2(L-1)} \\ 1 & W_X^3 & W_X^6 & W_X^9 & \dots & W_X^{3(L-1)} \end{bmatrix}, W_X = \exp\left(\frac{-j2\pi}{K}\right), K = 4L$$

Since data are inputted in row-wise scanned order, and the twiddle factors are multiplied accordingly. More specifically, the twiddle factor ROM address counter reads out the array having 4L elements in the following order.

$$\begin{bmatrix} 0 & 1 & 2 & 3 & \dots & L-1 \\ L & L+1 & L+2 & L+3 & \dots & 2L-1 \\ 2L & 2L+1 & 2L+2 & 2L+3 & \dots & 3L-1 \\ 3L & 3L+1 & 3L+2 & 3L+3 & \dots & 4L-1 \end{bmatrix}$$

In general, when N=N$_0$×N$_1$× . . . ×N$_{M-1}$, one can generalize the above twiddle factor table as follow. At the Stage m,m>0, the twiddle factor array is give by a N$_m$ by L array, if m=0, then L=1 and no twiddle factors are needed. The twiddle factor matrix is;

$$\begin{bmatrix} 1 & \dots & 1 & 1 & \dots & 1 \\ 1 & W_K & W_K^2 & W_K^3 & \dots & W_K^{L-1} \\ 1 & \dots & & & & \\ 1 & W_K^{N(h+1)-1} & W_K^{2(N(h+1)-1)} & \dots & \dots & W_K^{(N(h+1)-1)(L-1)} \end{bmatrix},$$

$$W_K = \exp\left(\frac{-j2\pi}{K}\right), K = N_0 \times \dots \times N_m$$

The twiddle factor table is read row-wise scanned order as before.

OPERATION OF 256-POINT FFT DEVICE

Referring to FIG. 7-A, in operation device 10, a block of data made of complex word x(l), l=0, 1, . . . , 255, are provided serially from the output terminal 21. An identical size data block follows the current block, and another follows and so forth. After the first block of 256 words has been received, input data are continuously received and stored in another part of the input buffer, device 11, while received 256 word data are read serially in a radix-4 reversed manner. The radix-4 reversal is achieved using the read address generated by device 12 in the manner described above by interchanging the address lines during the read; A0<−>A6,A1 <−>A7,A2 <−>A4,A3 <−>A5,A4 <−>A2,A5 <−>A3,A6 <−>A0, and A7 <−>A1, as shown in FIG. 4-A.

Stage 0

The radix-4 reversed data are provided to the input of Stage 0, device 14, where L$_0$=1. The 4-point DFT is performed for every consecutive 4 input data by device 14 with timings as shown in FIG. 9-A. During the first three clock cycles, the modes of 2×2 switches, shown in FIG. 5-A and FIG. 6-B, devices 105, 106 and 107, are changed at each clock as shown in the FIG. 9-A. The numbers inside the clock boxes in FIG. 9-A represent switch modes during the clock period. At the fourth clock cycle, the first 4-point DFT data are produced at the outputs of the adders in devices 101,102,103 and 104 within device 14-1 shown in FIG. 5-A. At the fourth clock cycle, the signal Acc/Load-0 goes to LOW. As a result, three of the 4-point DFT results are directed to lower auxiliary storage elements through multiplexers devices 201 and 202, within devices 102,103, and 104. The primary accumulation storage elements are reset by AND gates devices 203 and 204, within devices 101,102, 103, and 104. Since the top block device 101, does not have auxiliary shift-register as shown in FIG. 3-B, the outputs of the adders are directly transferred to the Stage 1, device 15. Therefore, Stage 0 finishes 4-point DFT at the 4$^{th}$ clock cycle and the first output is sent to Stage 1 at the same line.

When Acc/Load-0 signal goes back to HIGH, the Aux-Shift Registers within devices 102,103, and 104 are connected each other and form a three-stage shift register chain. Therefore, during the following three clock cycles, the data at those Aux-Shift Registers within device 102,103 and 104 are shifted out to Stage 1, one by one at each clock. While the data in the Aux-Shift Registers are shifted out during $5^{th}$, $6^{th}$, and $7^{th}$ clocks, new accumulation are made at the primary storage devices within devices 101,102,103, and 104 to toward the next 4-point DFT. At the $8^{th}$ clock, the completed 4-point DFT results of the next block appear at the outputs of the adders in devices 101,102,103, and 104. The output of the device 101 is directly transferred to the next stage while the other three outputs are stored in the Aux-Shift Registers within devices 102,103, and 104. During the next three clock cycles, the results in the Aux-shift-register are shifted out to the next stage. This process continues and all the transforms are computed in a pipelined fashion.

Stage 1

At Stage 1, device 15 in FIG. 7-A, input data are multiplied with complex twiddle factors. The twiddle factor table address is generated by Twiddle Factor Address Counter shown in FIG. 8-A with $L_1=4$ and a modulo-16 counter. Stage 1 performs 4 columns ($L_1=4$) of 4-point DFTs after input data are multiplied with twiddle factors.

The input data becomes available at the $4^{th}$ clock cycle (clock 3) from Stage 0 as explained. It requires 16 clock cycles to finish 4 columns of 4-point DFTs. Therefore at the $20^{th}$ clock cycle Stage 1 outputs the first 16-point DFT. Stage 1 requires 12 clocks to generate the first output from the time of the first input. This can be seen from FIG. 3-D-(b) where the first columns receives its $4^{th}$ (the last) input data after 12 clocks from the first input. Therefore, the first output from Stage 1 become available at the $16^{th}$ clock cycle (clock 15). Four more clock cycles are needed to complete the transform, during which time the first four transform results from device 101 in device 15-2 in FIG. 7-A are transferred to Stage 2 and the rest of results are transferred to Aux-Shift Registers within devices 102, 103, and 104 inside 15-2. Additional 12 cycles (with Acc/Load-1 high) are needed to shift data out to Stage 2 from those Aux-Shift-Registers. Therefore at the $32^{nd}$ clock cycle (16+4+12=32), the first 16-point DFT results is completely transferred to Stage 2.

Stage 2

At Stage 2, device 16 in FIG. 7-A, the twiddle factor table (ROM) address is generated by Twiddle Factor Address Counter shown in FIG. 8-A with $L_2=16$ and a modulo-64 counter. Stage 2 performs 16 columns ($L_2=16$) of 4-point DFTs after input data are multiplied with twiddle factors.

The input data become available at the $16^{th}$ clock cycle (clock 15) from Stage 1. It requires 64 clock cycles to finish 16 columns of 4-point DFTs. Therefore at the $80^{th}$ clock cycle Stage 2 completes the first 64-point DFT.

Stage 2 requires 48 clocks to generate the first output from the time of the first input (see FIG. 3-D-(c)). Therefore, the first output become available from the $64^{th}$ clock cycle, from which 16 more clock cycles are needed to complete the transform, while the first 16 transform results from device 101 in device 16-2 are transferred to Stage 3. The rest of the results are stored in the Aux-Shift-Registers within device 16-2 in FIG. 7-A. Additional 48 clock cycles (with Acc/Load-2-high) are needed to shift out transform results from those Aux-Shift-Registers. Therefore at the $128^{th}$ clock cycle (64+16+48=128), 64-doing DFT results are completely transferred to Stage 3.

STAGE 3

At Stage 3, device 17 in FIG. 7-A, the twiddle factor table address is generated by Twiddle Factor Address Counter shown in FIG. 8-A with $L_3=64$ and a modulo-256 counter. Stage 3 performs 64 columns of 4-point DFTs after input data are multiplied with twiddle factors.

The input data to Stage 3 become available at the $64^{th}$ clock cycle (clock 63) from Stage 2 as described above. Since it requires 64×4=256 clock cycles to finish the computation, Stage 3 completes the computation at the $320^{th}$ clock. Stage 3 requires 192 (=3×64) clock cycles to generate the first output from the time of the first input. Therefore, the first output become available from the $256^{th}$ clock cycle, from which 64 more clock cycles are needed to complete the transform while the first 64 transform results are transferred to the output terminal 22 in FIG. 7-A. The rest of the transform results are transferred to the Aux-Shift-Registers within device 17-2 in FIG. 7-A. Additional 192 cycles (with Acc/Load-3 high) are needed to shift out transform results from those Aux-Shift-Registers. Therefore at the $512^{th}$ clock cycle (256+64+192=512), 256-point DFT results are completely transferred to the output terminal 22 in FIG. 7-A.

OPERATION OF $N(=N_0 \times N_1 \times, \ldots \times N_{M-1})$-POINT FFT

Referring to FIG. 7-B, in operation of device 50, a block of data made of complex words, x(i), i=1,2, . . . , $N_0 \times N_1 \times \ldots \times N_{M-1}$ are provided serially from the input terminal 61. A data block with the same size follows the current block, and another block follows, and so on. The same size data block follows the current one, and another block follows, and so forth. After a block of $N_0 \times N_1 \times \ldots \times N_{M-1}$ words are received, input data are continuously received and stored in another part of the input buffer, device 51, while received $N_0 \times N_1 \times \ldots \times N_{M-1}$ data are read out serially in a mixed radix reversed manner as described before. The mixed radix reversed data produced by Mixed Radix Reversal Address Generator, device 52, are provided to Stage 0.

At Stage 0, the $N_0$-point DFT is performed on every $N_0$ input data by device 54, without interleaving ($L_0=1$). At the $N_0$-th clock cycle, the first output of the $N_0$-point DFT results is provided Stage 1, device 55, while the rest of DFT components are stored in Aux-Shift-Registers within device 54-1 in FIG. 7-B, and at the same time accumulation shift-registers are reset for the next DFT computation. $N_0-1$ more cycles (with Acc/Load-0 high) are needed to shift out the remaining DFT components from said Aux-Shift-Registers. As a result, the output from Stage 0 is completely transferred to Stage 1 at the $2 \times N_0$-th cycle starting from $N_0$-th clock.

Stage 1, device 55, performs $N_0$ columns of $N_1$-point DFTs, with $L_1=N_0$. The results from Stage 0 are multiplied with twiddle factors by the device 55-1. The twiddle factor table, device 55-3, has $N_0 \times N_1$ entries and addressed by a modulo-$N_0 \times N_1$ counter. The input data to Stage 1 becomes available at the $N_0^{th}$ clock from Stage 0 as described above.

It requires $N_0 \times N_1$ clock cycles to finish the computation for $N_0$ columns of $N_1$-point DFTs. Therefore Stage 1 completes the computation at the $N_0+N_0 \times N_1$ clock. Stage 1 requires $N_0 \times (N_1=1)$ clock cycles to generate the first output form the time of the first input. Therefore, at the $N_0 \times N_1$-th clock, the first output from Stage 1 becomes available, from which $N_0$ more clock cycles are needed to finish the transform and transfer first $N_0$ transform results to the next stage. During the same time, primary accumulation shift-registers are reset and the rest of the transform results are transferred to the Aux-Shift-Registers within device 55-2 in FIG. 7-B. Additional $N_0 \times (N_1-1)$ cycles (with Acc/Load-1 high) are needed to shift out DFT results from said Aux-Shift-Registers. Therefore at the $2 \times N_0 \times N_1$ clock ($N_0 \times N_1 + N_0 + N_0 \times (N_1-1)$), $N_0 \times N_1$-point DFT results are completely transferred to Stage 2.

Stage 2, device 55, performs $N_0 \times N_1$ columns of $N3_1$-point DFTs, with $L_2 \times N_0 \times N_1$. The results from Stage 1 are multiplied with twiddle factors by the device 56-1. The twiddle factor table, device 56-3, has $N_0 \times N_1 \times N_2$ entries and addressed by a modulo-$N_0 \times N_1 \times N_2$ counter. The input data to Stage 2 become available at the $N_0 \times N_1^{th}$ clock from Stage 1. At the $N_0 \times N_1 \times N_2$-th clock, the first output from Stage 2 become available, from which $N_0 \times N_1$ more clock cycles are needed to complete the transform and transfer first $N_0 \times N_1$ transform results to the output terminal 62. During the same time, primary accumulation shift-registers are reset and the rest of the transform results are transferred to Aux-Shift-Registers within device 56-2. Additional $N_0 \times N_1 \times (N_2-1)$ cycles are needed to shift out transform results from said Aux-Shift-Registers. Therefore, the output from Stage 2 is transferred completely to the output terminal 62 at the $2 \times N_0 \times N_1 \times N_2$-th cycle.

The above description of the invention is intended to be illustrative and not limiting. Various changes or modifications in the embodiments described may occur to those skilled in the art and these can not be made without departing from the spirit or scope of the invention.

I claim:

1. A device for performing one dimensional Fast Fourier Transforms (FFTs) on streamlined blocks of input data of size, $N = N_0 \times N_1 \times \ldots \times N_{M-1}$ where $N_m$ m=0,1,2,..., M-1, are positive numbers, via sequence of two-dimensional row-column transform computations of sizes, $N_0 \times N_1, (N_0 \times N_1) \times N_2, (N_0 \times N_1 \times N_2) \times N_3, \ldots, (N_0 \times N_1 \times \ldots \times N_{M-2}) \times N_{M-1}$ comprising:

an input buffer with a radix reversal means, M stages, each m-th stage including one dimensional $N_m$-point DFT means for computing $L_m$ columns of DFTs in a time-multiplexed scheme, where $L_m = N_0 \times N_1 \times \ldots \times N_{m-1}$, and twiddle factor multiplication means between consecutive stages, wherein said one dimensional $N_1$-point DFT means for computing $L_m$ columns of DFT further comprises:

$N_m$ plurality of time-division multiplexed (by a factor of $L_m$) accumulators with an input terminal, an output terminal and by-pass input terminals, respectively, a chain of said $N_m$ time-division multiplexed accumulators with said output terminals connected to said by-pass input terminals of neighboring time-division accumulators, respectively, wherein said input terminal of the a time-division multiplexed accumulator in the chain is connected to ground (logical zero) and said output terminal of a last time-division multiplexed accumulator in the chain constitutes an output terminal of said $N_m$-point DFT means, $N_m$-1 plurality of complex multipliers with respective outputs connected to first $N_m$-1 input terminals of said time-division multiplexed accumulator chain respectively, a complex input terminal connected to an input terminal of the remaining time-multiplexed accumulator and all multiplicant inputs of said $N_m$-1 complex multipliers, and $N_m$-1 plurality of $N_m$-point DFT coefficient ROMs (excluding DC coefficient) with each output connected to remaining inputs of said $N_m$-1 complex multipliers, respectively.

2. The device of claim 1, wherein $N_0 = N_1 = \ldots = N_{M-1} = 2$.

3. The device of claim 1, wherein $N_0 = N_1 = \ldots = N_{M-1} = 4$.

4. The device of claim 1, wherein said radix reversal means comprises circuits for input address and output address for said input buffer, wherein said output address lines are derived from said input address lines according to a generalized mixed radix reversal algorithm comprising counters, multipliers and adders.

5. The device of claim 1, wherein said twiddle factor multiplication means at stage m comprises a multiplier and a twiddle factor ROM and a modulo-$N_m \times L_m$ counter for twiddle factor ROM address.

6. The device of claim 1, wherein said time-division multiplexed (by a factor of $L_m$) accumulator comprises two types of devices;

a first type device comprises primary $L_m$ storages for multiple independent accumulated in a time-division multiplexed manner, and auxiliary $L_m$ storages for overlapping computations between transform block boundaries, and a second type device identical to said first type device except that it does not have said auxiliary storages.

7. The device of claim 1, where in said time-division multiplexed accumulator further comprises a device for resetting primary storages while primary storage data are transferred to auxiliary storages.

8. The device of claim 1, where $N_m = 4$ and said multipliers and said DFT coefficient ROMs are replaced with switches and switch control circuits for $L_m$ multiple column transforms.

9. A method of performing one-dimensional FFT on a streamlined blocks of input data of size, $N = N_0 \times N_1 \times \ldots \times N_{M-1}$ where $N_m$ m=0,1,2,..., M-1, are positive numbers, via sequence of two-dimensional row-column transform computations of sizes, $N_0 \times N_1, (N_0 \times N_1) \times N_2, (N_0 \times N_1 \times N_2) \times N_3, \ldots, (N_0 \times N_1 \times \ldots \times N_{M-2}) \times N_{M-1}$, comprising steps of:

receiving data sequentially into an input buffer and reading out data from said input buffer to achieve a radix reversal, performing M stages of computation, at each m-th stage, $L_m$ columns of $N_m$-point DFTs, m=0,1,..., M-1, are computed with a time-division multiplexing with a multiplexing factor of $L_m = N_0 \times N_1 \times \ldots \times N_{m-1}$, wherein said steps of time-division multiplexed computation of $L_m$ columns of $N_m$-point DFTs further comprises:

steps of $N_m$ plurality of time-division multiplexed (by a factor of $L_m$) accumulations, transferring accumulated data (DFT result) to a following stage through a chain of auxiliary storages while next accumulations are being performed, multiplying twiddle factors between stages further comprising row-wise scanning of a $N_m \times L_m$ twiddle factor ROM array, and multiplying each scanned element with incoming data one by one, producing a progressively larger DFTs of sizes ($N_0 \times N_1$), ($N_0 \times N_1 \times N_2$), ($N_0 \times N_1 \times N_2 \times N_3$), ..., ($N_0 \times N_1 \times \ldots \times N_{M-2} \times N_{M-1}$), and resulting storage devices while DFT result data are being transferred to the following stage in preparation for a next block DFT computation.

10. The method of claim 9, wherein $N_0 = N_1 = \ldots = N_{M-1} = 2$.

11. The method of claim 9, wherein $N_0 = N_1 = \ldots = N_{M-1} = 4$.

* * * * *